(12) United States Patent
Cheong et al.

(10) Patent No.: US 7,027,537 B1
(45) Date of Patent: Apr. 11, 2006

(54) ITERATIVE MULTI-USER DETECTION

(75) Inventors: Kok-Wui Cheong, Stanford, CA (US); Won-Joon Choi, Mountain View, CA (US); Johnny Li-Shung Fan, Palo Alto, CA (US); Zining Wu, Los Altos, CA (US); John M. Cioffi, Los Altos, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 09/519,727

(22) Filed: Mar. 3, 2000

Related U.S. Application Data (60) Provisional application No. 60/123,088, filed on Mar. 5, 1999.

(51) Int. Cl.
*H03D 1/06* (2006.01)
*H03D 11/04* (2006.01)
*H03K 5/01* (2006.01)
*H03K 6/04* (2006.01)
*H04B 1/10* (2006.01)

(52) U.S. Cl. .................... 375/348; 375/285; 370/201; 455/295

(58) Field of Classification Search ............... 375/346, 375/349, 148, 206, 295, 296, 298, 257, 285; 370/201; 379/416, 417, 414, 406.01; 455/295, 455/296
See application file for complete search history.

(56) References Cited

U.S. PATENT DOCUMENTS

| | | | |
|---|---|---|---|
| 4,087,654 A * | 5/1978 | Mueller ............... 379/406.08 |
| 4,131,767 A * | 12/1978 | Weinstein ............ 379/406.08 |
| 4,438,530 A * | 3/1984 | Steinberger .......... 455/278.1 |
| 4,464,545 A * | 8/1984 | Werner ............... 370/286 |
| 4,715,064 A * | 12/1987 | Claessen ............. 379/392 |
| 4,995,104 A * | 2/1991 | Gitlin ............... 375/349 |
| 5,157,697 A * | 10/1992 | Anvari et al. ........ 375/349 |
| 5,208,786 A * | 5/1993 | Weinstein et al. ..... 367/124 |
| 5,471,647 A * | 11/1995 | Gerlach et al. ....... 455/63.1 |
| 5,553,062 A | 9/1996 | Schilling et al. |

(Continued)

FOREIGN PATENT DOCUMENTS

EP 0814574 12/1997

(Continued)

OTHER PUBLICATIONS

Cheong et al., Rejection of Home LAN NEXT in VDSL via Soft cancellation (TD15), Sep. 20-24, 1999, Stanford University, Stanford, CA.

(Continued)

*Primary Examiner*—Jean B. Corrielus
(74) *Attorney, Agent, or Firm*—Crawford Maunu PLLC; Robert J. Crawford (57) ABSTRACT

Methods and mechanisms for reducing the impact of cross talk interference in multi-carrier data transmission systems are disclosed. In one aspect, the invention relates to a method of canceling cross talk interference in a received data signal. The method includes receiving an input signal that includes a primary data signal and a superimposed cross-talk signal. An estimation of the primary data signal and an estimation of the superimposed cross talk signal are iteratively computed. The probable estimation of the primary data signal is based at least in part upon the iteratively computed probable estimation of the cross talk signal and the probable estimation of the superimposed cross talk signal is based at least in part upon the iteratively computed probable estimation of the primary data signal.

22 Claims, 7 Drawing Sheets

U.S. PATENT DOCUMENTS

| | | | |
|---|---|---|---|
| 5,594,756 A | * 1/1997 | Sakurai et al. | 375/233 |
| 5,694,421 A | * 12/1997 | Park | 375/227 |
| 5,731,706 A | * 3/1998 | Koeman et al. | 324/628 |
| 5,740,256 A | * 4/1998 | Castello Da Costa et al. | 381/94.7 |
| 5,832,032 A | * 11/1998 | Overbury | 375/285 |
| 5,870,361 A | * 2/1999 | Audoin | 369/44.41 |
| 5,887,032 A | * 3/1999 | Cioffi | 375/346 |
| 5,901,185 A | * 5/1999 | Hassan | 375/346 |
| 5,937,014 A | * 8/1999 | Pelin et al. | 375/340 |
| 5,995,567 A | 11/1999 | Cioffi et al. | |
| 6,005,893 A | 12/1999 | Hyll | |
| 6,058,256 A | * 5/2000 | Mellen et al. | 716/12 |
| 6,160,790 A | * 12/2000 | Bremer | 370/201 |
| 6,192,503 B1 | * 2/2001 | Chennakeshu et al. | 714/796 |
| 6,496,534 B1 | * 12/2002 | Shimizu et al. | 375/148 |
| 6,522,699 B1 | * 2/2003 | Anderson et al. | 375/295 |

FOREIGN PATENT DOCUMENTS

| | | |
|---|---|---|
| WO | 98/54856 | 12/1998 |
| WO | WO 98/10528 | * 12/1998 |

OTHER PUBLICATIONS

Cioffi et al., "G.vdsl: Fundamentals requirements induced by G.pnt/G.vdsl mixture", Nov. 1-5, 1999, Nashville, Tennessee.

* cited by examiner

ITERATIVE MULTI-USER DETECTION

CROSS-REFERENCE TO RELATED APPLICATION

This application claims the benefit to U.S. Provisional No. 60/123,088 filed on Mar. 5$^{th}$ 1999, the disclosure of which is incorporated herein by reference.

BACKGROUND OF THE INVENTION

The present invention relates to data transmission systems and, more particularly, to the cancellation of cross talk interference at a receiver.

Bi-directional digital data transmission systems are presently being developed for high-speed data communication. One standard for high-speed data communications over twisted-pair phone lines that has developed is known as Asymmetric Digital Subscriber Lines (ADSL). Another standard for high-speed data communications over twisted-pair phone lines that is presently proposed is known as Very-High-Speed Digital Subscriber Lines (VDSL).

The Alliance For Telecommunications Information Solutions (ATIS), which is a group accredited by the ANSI (American National Standard Institute) Standard Group, has finalized a discrete multi tone based approach for the transmission of digital data over ADSL. The standard is intended primarily for transmitting video data and fast Internet access over ordinary telephone lines, although it may be used in a variety of other applications as well. The North American Standard is referred to as the ANSI T1.413 ADSL Standard (hereinafter ADSL standard). Transmission rates under the ADSL standard are intended to facilitate the transmission of information at rates of up to 8 million bits per second over twisted-pair phone lines. The standardized system defines the use of a discrete multi tone (DMT) system that uses 256 "tones" or "sub-channels" that are each 4.3125 kHz wide in the forward (downstream) direction. In the context of a phone system, the downstream direction is defined as transmissions from the central office (typically owned by the telephone company) to a remote location that may be an end-user (i.e., a residence or business user). In other systems, the number of tones used may be widely varied. However when modulation is performed efficiently using an inverse fast Fourier transform (IFFT), typical values for the number of available sub-channels (tones) are integer powers of two, as for example, 128, 256, 512, 1024, 2048 or 4096 sub-channels.

The ADSL standard also defines the use of a reverse signal at a data rate in the range of 16 to 800 Kbit/s. The reverse signal corresponds to transmission in an upstream direction, as for example, from the remote location to the central office. Thus, the term ADSL comes from the fact that the data transmission rate is substantially higher in the downstream direction than in the upstream direction. This is particularly useful in systems that are intended to transmit video programming or video conferencing information to a remote location over telephone lines.

ANSI is producing another standard for subscriber line based transmission systems, which is referred to as the VDSL standard. The VDSL standard is intended to facilitate transmission rates of at least 25.96 Mbit/s and preferably at least 51.92 Mbit/s in the downstream direction. To achieve these rates, the transmission distance over twisted pair phone lines must generally be shorter than the lengths permitted using ADSL. Simultaneously, the Digital, Audio and Video Council (DAVIC) is working on a similar system, which is referred to as Fiber To The Curb (FTTC). The transmission medium from the "curb" to the customer premise is standard unshielded twisted-pair (UTP) telephone lines.

A number of multi-carrier modulation schemes have been proposed for use in the VDSL and FTTC standards (hereinafter VDSL/FTTC). One proposed multi-carrier solution utilizes discrete multi-tone signals in a system that is similar in nature to the ADSL standard. Other proposed modulation schemes include carrierless amplitude and phase modulated (CAP) signals and discrete wavelet multi-tone modulation (DWMT). In order to achieve the data rates required by VDSL/FTTC, the transmission bandwidth must be significantly broader that the bandwidth contemplated by the ADSL. By way of example, the discrete multi-tone system adopted for ADSL applications utilizes a transmission bandwidth on the order of 1.1 MHz, while bandwidths on the order of 20 MHz are being contemplated for VDSL/FTTC applications. In one proposed DMT system for VDSL/FTTC applications, the use of 256 "tones" or "sub-channels" that are each 69 kHz wide is contemplated. In another proposed DMT system for VDSL/FTTC applications, the use of 4096 "tones" or "sub-channels" that are each 4.3125 kHz wide is contemplated.

The use of these wide band multi-carrier modulation approaches have some inherent obstacles that must be overcome. One particular problem relates to cross talk interference that is introduced to the twisted pair transmission line and received by the modem. As is well known to those skilled in the art, cross talk interference is unwanted interference (signal noise) that is passed between adjacent network cables or devices. Cross talk generally occurs due to coupling between wire pairs when wire pairs in the same bundle are used for separate signal transmission. In this manner, a data signal from one source may be superimposed on a data signal from a second source. As can be appreciated, the data signals being transmitted over the twisted-pair phone lines can be significantly degraded by the cross talk interference generated on an adjacent twisted-pair phone line. As the speed of the data transmission increases, the problem worsens. For example, in the case of VDSL signals being transmitted over the twisted-pair phone lines, the cross talk interference can cause significant degradation of the VDSL signals.

The undesired cross talk interference can come from a variety of sources. One particular source of cross talk interference is from home phone network devices that use existing twisted-pair phone wiring for networking. By way of example, the Home Phone Network Alliance (HomePNA or HPNA) is one organization dedicated to solutions for in-home, phone line-based networking. The HPNA signal is a single carrier signal that tends to occupy a band that is less than approximately 6 MHz wide. As can be appreciated, the band may overlap some portion of the VDSL band, and as a result, the VDSL and HPNA signals tend to occupy some of the same frequency bands. By way of example, HPNA signals generally operate with a frequency between about 4 to about 10 MHz. Accordingly, with high speed data transmission, the cross talk interference produced by HPNA signals and other sources can significantly degrade the desired VDSL data signals being transmitted over twisted-pair phone lines.

Hence, the problem with using twisted-pair phone lines with high frequency data transmission rates, such as available with ADSL and VDSL, is that the cross talk interference becomes a substantial impediment to a receiver being unable to properly receive the transmitted data signals. Thus, there is a need to provide techniques to eliminate or compensate for cross talk interference.

SUMMARY OF THE INVENTION

The present inventions relate to methods and mechanisms for reducing the impact of cross talk interference in multi-carrier data transmission systems. In one embodiment, the invention relates to a method of canceling cross talk interference in a received data signal. When an input signal that includes a primary data signal and a superimposed cross-talk signal is received, an estimation of the primary data signal a estimation of the superimposed cross talk signal are iteratively computed. The estimation of the primary data signal is based at least in part upon the iteratively computed estimation of the cross talk signal and the estimation of the superimposed cross talk signal is based at least in part upon the iteratively computed estimation of the primary data signal.

In some embodiments, the primary data signal is a discrete multi-tone signal. In other embodiments, the primary data signal is a VDSL signal and the superimposed cross talk signal is an HPNA signal. However, it should be appreciated that the described methods can be applied to a wide range of modulation schemes and communication protocols that experience cross-talk.

The invention relates, in another embodiment, to a method of canceling cross talk interference in a received data signal. When a symbol block is received an estimate is made of the symbols in the symbol block. Expected value for each symbol in the symbol block are then iteratively calculated to refine the estimation of the received signal. The final calculation of the expected values are then used as the ultimate estimation of the received signal.

In most embodiments, the iteratively calculating includes executing soft cancellation of the estimate or the expected value from a preceding calculation.

In some embodiments, soft cancellation includes subtracting the estimates from the symbol block to produce a soft symbol for each of the symbols in the symbol block. In other embodiments, soft cancellation includes subtracting the expected values from the symbol block to produce a soft symbol for each of the symbols in the symbol block. In other embodiments, an interference power is calculated to account for the uncertainty in the estimate.

In most embodiments, the iteratively calculating includes computing a plurality of probable values, which are based at least in part on the calculated interference power and the resultant soft cancellation. The iteratively calculating also includes determining the expected value from the plurality of probable values.

In a preferred embodiment, the symbol block includes primary data signal symbols and superimposed cross talk signal symbols. In some embodiments, the primary data signal is a VDSL signal and the superimposed cross talk signal is an HPNA signal.

The invention relates, in another embodiment, to a method for removing cross talk interference due to a cross talk source that undesirably interferes with the reception of data being transmitted over a transmission medium. The method includes receiving an input signal including a first signal that is superimposed on a second signal. The received signal having a symbol block with input symbols that include a first set of symbols associated with the first signal and a second set of symbols associated with the second signal. The method further includes producing an estimate for the input symbols. The method additionally includes subtracting the effect of the estimate from the received symbol block. The method also includes computing a probability distribution for each of the input symbols wherein the computing is based at least in part on the estimate. The method further includes calculating a weighted average from the probability distribution such that the weighted average indicates a more likely value for the input symbols. The method also includes repeating the aforementioned steps to produce an expected value for each of the input symbols.

In most embodiments, an interference power is calculated to account for the uncertainty in the estimate. The interference power is used in computing the probability distribution.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Methods, devices and protocols appropriate for implementing iterative multi-user detection in multi-carrier transmission systems will now be described in detail with reference to a few preferred embodiments thereof and as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

The invention pertains to an iterative multi-user detection technique for canceling or otherwise compensating for cross talk interference from received signals. The technique generally includes receiving an input signal that includes a primary data signal and a superimposed cross-talk signal. The technique involves iteratively computing both a probable estimation of the primary data signal and a probable estimation of the superimposed cross talk signal. The invention is particularly useful for high speed data transmission, such as VDSL and ADSL, where cross talk interference is a substantial impediment to proper reception of transmitted data. However, it should be apparent that the invention can be readily applied to a wide variety of modulation schemes, communication protocols and transmission mediums. The invention is explained in detail below with reference to several embodiments.

Figure 1:
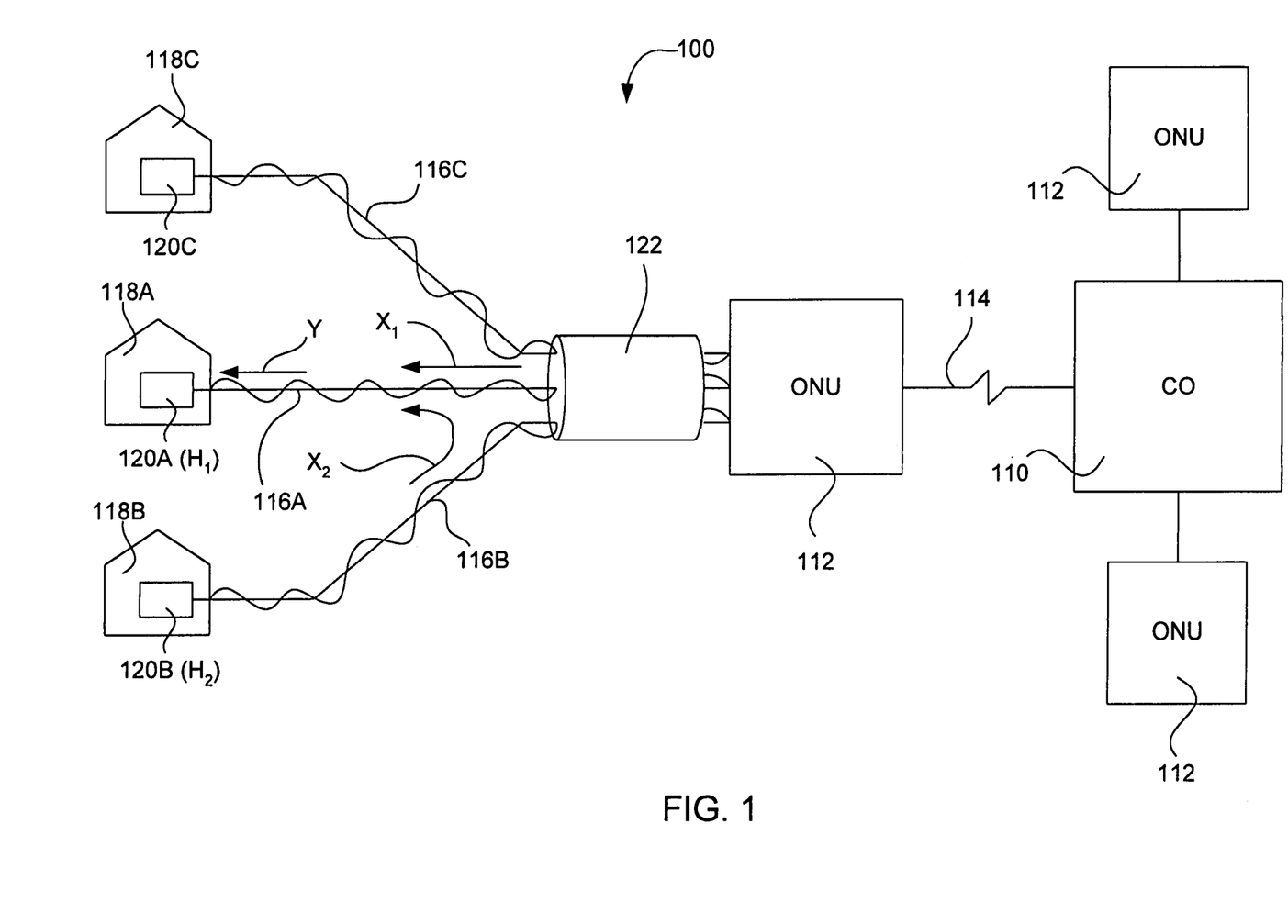
FIG. 1 is a block diagram of a subscriber line based communication system having a plurality of twisted pair phone lines that extend from an optical network unit to receptive remote units, in accordance with one embodiment of the present invention.

Referring initially to FIG. 1, the customer end of a typical telephone line based wired communications network 100 will be described. The system includes a central office 110 that services a plurality of distribution posts 112 which may take the form of optical network units (ONU). Each distribution post 112 communicates with the central office 110 over one or more high speed, multiplexed transmission line 114 that may take the form of a fiber optic line. The distribution post 112 typically serves a multiplicity of discrete subscriber lines 116, which are coupled to a multiplicity of single end users 118. In most situations, the distribution posts 112 are located proximate to the single end users 118. Furthermore, even though fiber optics may be available from a central office to the distribution posts, twisted-pair phone lines (discrete subscriber lines 116) are generally used to bring in the signals from the distribution post into the end user's home or business.

Some end users 118 may have a remote unit 120 suitable for communicating with the distribution post 112 at very high data rates. The remote units 120 generally include a modem but may take the form of a variety of different devices, as for example, a telephone, a set top box, a television, a monitor, a computer, a conferencing unit, etc. In practice, most existing DSL lines utilize a discrete multitone (DMT) modulation scheme for communicating between the remote unit and the distribution post. However, in general, a wide variety of both multi-carrier and single carrier modulation schemes may be used.

As described in the background section, there is currently a growing interest in the use of in-home, phone line-based networking such as HPNA. One problem encountered with the use of phone line based networks is that the signals intended for internal transmission within a home will also be leaked out on the subscriber line 116B that services the home. The subscriber lines 116A, 116B serviced by a single distribution post 112 typically leave the distribution post 112 in a shielded binder 122. The shielding in the binder 122 generally serves as a good insulator against the emission (egress) and reception (ingress) of outside interference. Although the binder 122 provides resistance to outside interference, there is likely to be cross talk interference between the DSL signals on line 116A and the home networking (e.g. HPNA) signals inadvertently transmitted into the binder 122. In a situation such as VDSL and HPNA, wherein, adjacent subscriber lines 116 within the binder 122 carry information in the same range of frequencies, there can be significant cross talk interference. This is generally because cross talk-induced signals combine with the primary data signals, which were originally intended for transmission over individual subscriber lines.

By way of example, if end user 118A is receiving a first signal $X_1$ (e.g., VDSL) while end user 118B is transmitting a second signal $X_2$ (e.g., HPNA), a dampened version of the second signal $X_2$ may be superimposed on the first signal $X_1$ such that the received signal Y, at end user 118A, is the combination of signals $X_1$ and $X_2$. This is sometimes referred to as near end cross talk (NEXT). It should also be noted that the cross talk interference may also be simultaneously received from two or more specific transmitters, for example, a third signal emanating from an end user 118C may also be superimposed on the first signal $X_1$. Additionally, cross talk interference may be received from multiple signals within the same household or business.

The result of a superimposed cross talk signal is a slightly different shaped waveform than was originally transmitted. If the effects of the superimposed cross talk are not too significant, the systems can generally reconstruct the signal back into a digital format. However, if the superimposed cross talk becomes too significant, the signals are misinterpreted at the user's end and bit errors occur.

Figure 2A:
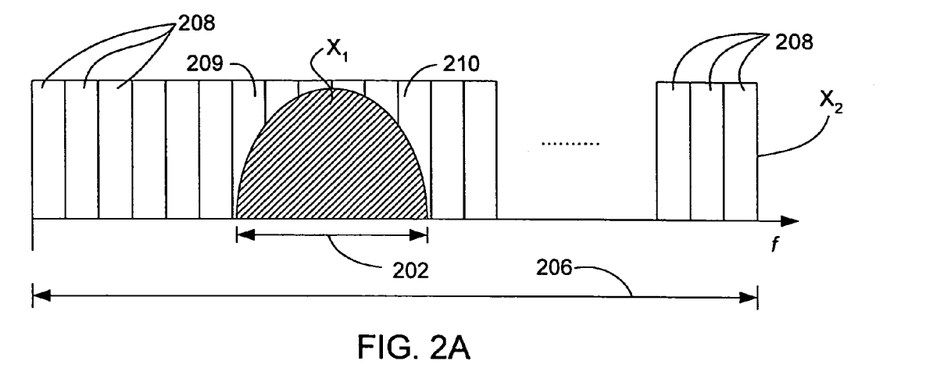
FIG. 2A is an illustration of the frequency domain of an input signal including a first signal and a second signal, in accordance with one embodiment of the present invention.
Figure 2B:
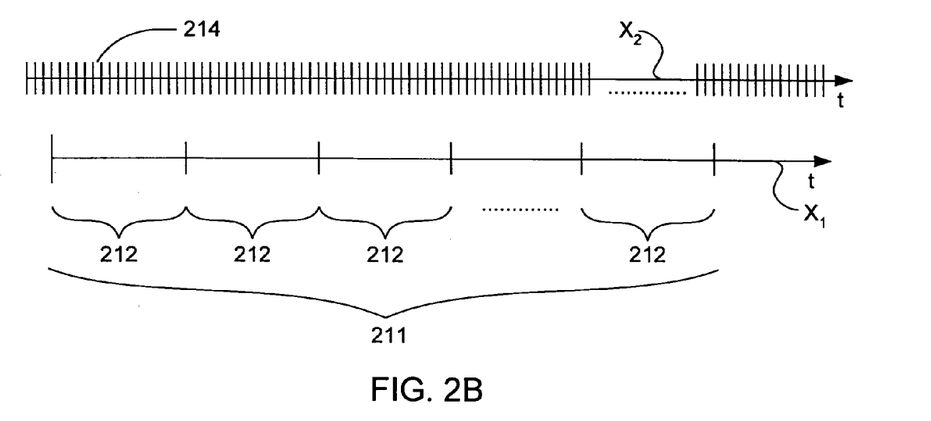
FIG. 2B shows two signals with respect to the time domain, in accordance with one embodiment of the present invention.
Figure 2C:
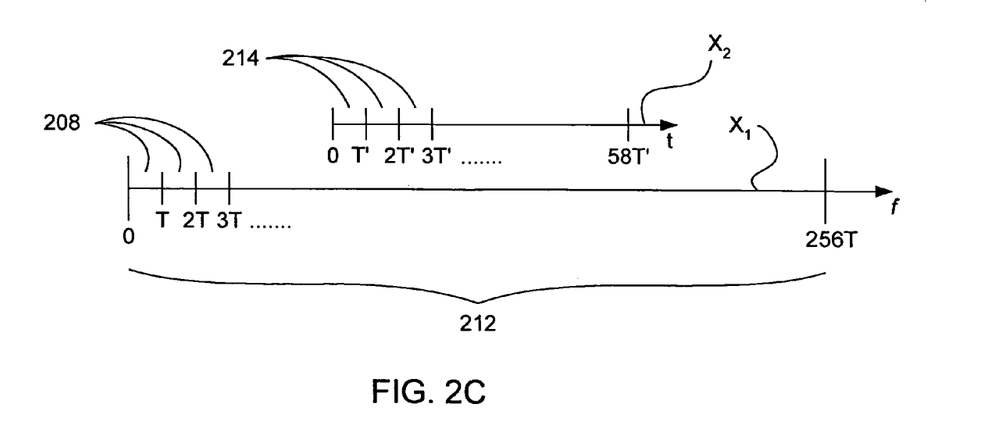
FIG. 2C is an illustration of a symbol block, which includes symbols from first signal and symbols from a second signal, in accordance with one embodiment of the present invention

To facilitate discussion, and to cite a specific example, FIGS. 2A–C illustrate the transmitted signals including the first signal $X_1$ which corresponds to a VDSL signal and the second signal $X_2$ which corresponds to an HPNA cross talk signal. The signal $X_1$ passes through a channel $H_1$ and the signal $X_2$ passes through a channel $H_2$. The received signal Y consists of $H_1X_1$, $H_2X_2$ and noise. FIG. 2A shows the two signals $X_1$ and $X_2$ with respect to the frequency domain f. The HPNA signal ($X_2$) is a single carrier signal that tends to occupy a band 202 that is approximately 6 MHz wide. In many proposals, the VDSL signal ($X_1$) is a multi-carrier signal that tends to have a very broad band 206. For example, at the time of this writing, bandwidths on the order of about 17.7 MHz wide are being proposed in DMT based systems. As is generally well known, the broad band 206 is broken up into a plurality of smaller bands or sub-carriers 208. The actual number of subcarriers used may be widely varied in accordance with the design of a particular system and the modulation scheme used, however typically an exponential factor of two is used (e.g., 128, 256, 512, 1024, 2048, 4096, etc. subcarriers). If the broad band 206 is broken up into 256 sub-carriers, each of the sub-carriers are about 69 kHz wide, and if the broad band 206 is broken up into 4096 sub-carriers, each of the sub-carriers are about 4 kHz wide.

By way of example, the HPNA signal may be centered around 7 MHz and may occupy a frequency band from about 4 MHz to about 10 MHz. As a result, the HPNA signal ($X_2$) tends to occupy some of the same tones as VDSL signal ($X_1$), and therefore, the HPNA signal tends to be superimposed on the VDSL signal. More particularly, if the HPNA signal is 6 MHz wide and centered on 7 MHz and the VDSL signal is between 0 and 17 MHz with 69 kHz wide subcarriers then it stands to reason that some of the subcarriers will be effected by the HPNA signal. As shown in FIG. 2A, the HPNA signal ($X_2$) is superimposed on sub-carriers from 209 to 210. Accordingly, in the case of VDSL, the HPNA end user operates in overlapping frequency ranges and as such are potential noise sources. Although the HPNA signal produced by the end user 118B may be useful signals, to the receiver system (e.g., end user 118A) the signals are cross talk noise that interfere with the reception of the VDSL signal.

FIG. 2B shows the two signals $X_1$ and $X_2$ with respect to the time domain t. In the time domain, the VDSL signal $X_1$ is generally transmitted in VDSL frames 211 that are broken up into a plurality of VDSL symbol blocks 212. In contrast, the HPNA signal $X_2$ is transmitted in a series of individual HPNA symbols 214. That is, there is no symbol block in HPNA and therefore the symbols are continuously transmitted one after the other. As can be appreciated, a plurality of HPNA symbols 214 will fall within one VDSL symbol block 212.

Referring next to FIG. 2C a particular example will be shown. In this embodiment, the HPNA signal has a symbol rate of 4 million symbols/sec, while the VDSL signal has 256 tones and a symbol rate of 35.7 million symbols per second (and thus about X symbol blocks per second). In this example, there are about 58 HPNA symbols for each VDSL symbol block 212. Since the VDSL signal is a multi-carrier signal, each VDSL symbol block has a plurality of tones (e.g. 256) each of which carry a sub-symbol which must be resolved. Thus, the combined signal within a single VDSL symbol block may have on the order of 314 components (i.e. 58 HPNA symbols and 256 tones).

In accordance with one aspect of the present invention, a method for removing cross talk interference due to a cross talk source that undesirably interferes with the reception of data being transmitted over a transmission medium will be described in detail. Conceptually, an effort is made to resolve both the desired data signal and the superimposed cross talk signal. By making the effort to resolve the cross talk signal, the cross talk can effectively be removed from the received signal to obtain the desired data signal.

Figure 3:
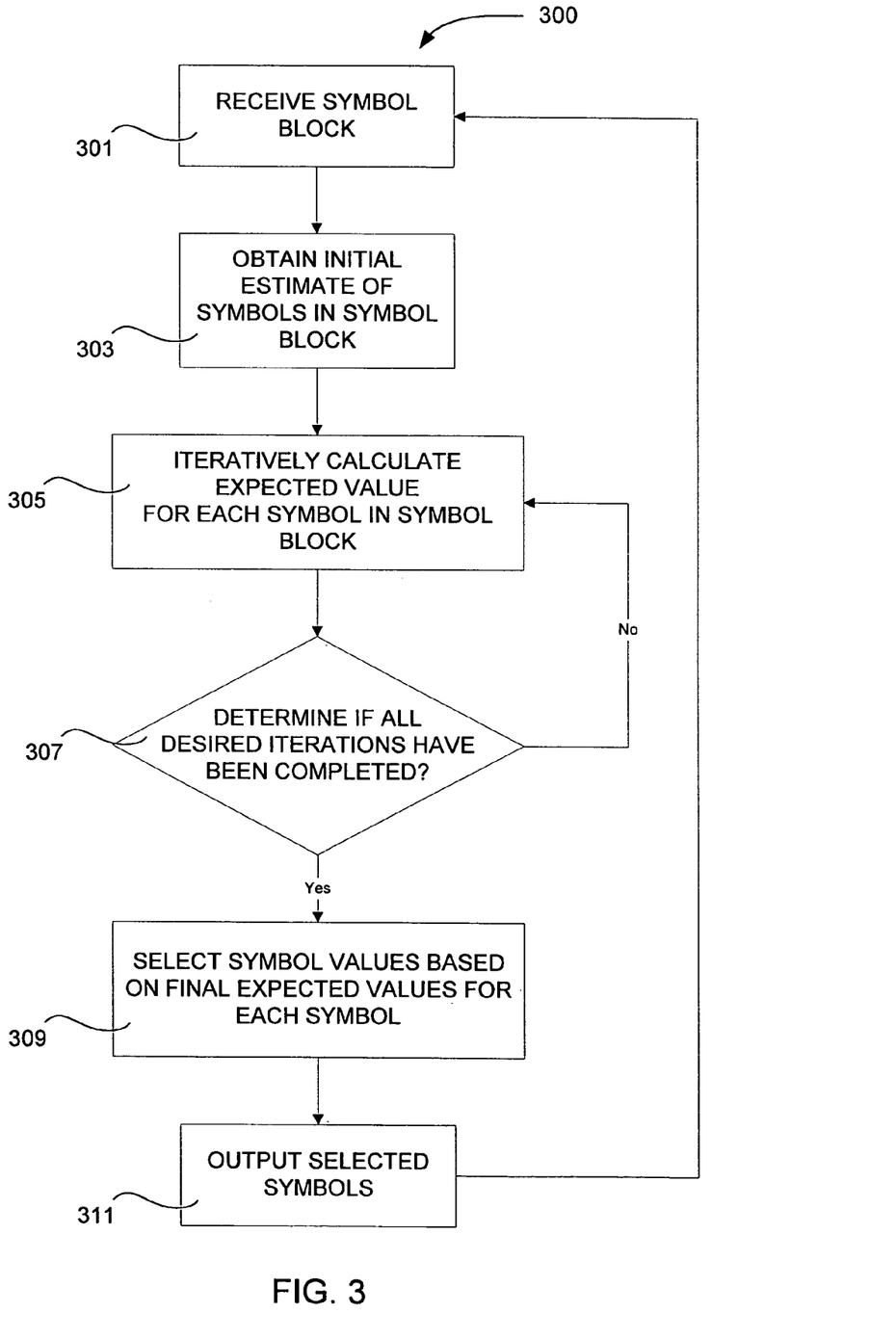
FIG. 3 is a flow diagram of the iterative multi-user detection technique, in accordance with one embodiment of the present invention.

Referring next to FIG. 3, a method of iteratively calculating the proper interpretation of a desired or "primary" data signal by determining the nature of cross-talk noise will be described. In the illustrated embodiment, the primary data signal is a DMT based VDSL signal and the superimposed cross talk noise is an HPNA signal. As will be appreciated by those skilled in the art, in DMT systems, various clocks including a symbol clock are synchronized between the transmitter (the ONU 112 in this example) and a receiver (the remote unit 120A). Thus, the receiver knows when a new symbol block (e.g., a block of 256 symbols, each carried on a separate tone) is expected. Initially, in step 301 a VDSL signal symbol block is received. It should be apparent that the actual signal received includes the desired primary data signal (e.g. a DMT symbol), the superimposed cross talk signal (e.g. numerous HPNA symbols) and any other noise.

When a signal symbol block is received, an initial estimate is made for the input symbols, which include VDSL and HPNA symbols. In one embodiment, the initial estimate is obtained by applying the pseudo-inverse of the channel matrix on the received signal and performing a clipping of this result to restrict the initial estimate to have a value less than the maximum value possible for each of the input symbols. It should be understood, however, that this is not a requirement. For example, this initial estimate can be set to all zero (although convergence in 305 might be slower). For the purposes of this explanation we will use the term "soft" symbol values to refer to the estimated (and later iteratively calculated) values of the various DMT tones and HPNA symbols.

After the initial estimates of the soft symbol values for both the HPNA cross-talk signal and the DMT tones have been calculated, the soft symbol values for both the HPNA cross-talk and the various DMT tones are iteratively recalculated in step 305. The iterative refinement of the soft symbol values are used to improve the calculation of the actual symbol values. By way of background, it should be appreciated that the input signal received on any particular tone will be a combination of several factors. These factors generally include the actual transmitted value of the transmitted DMT tone, the side lobes from adjacent tones within the DMT signal, and the impact of cross talk from adjacent lines and other noise. As can be appreciated, the side lobes, cross talk and other noise tend to have some effect on the primary data signal that cause the primary data signal to be misinterpreted at the user's end. Thus, the iterative refinement seeks to better account for the various second order effects that affect the original interpretation of the received signal (i.e., the initial estimates).

In brief, emissions associated with a particular DMT tone typically include a relatively high power emission centered about the frequency center and a number of side lobes of decreasing intensity extending on either side thereon. The location of the sidelobe power peaks are well defined. The first sidelobe peak is approximately midway between the first and second tones adjacent to the central tone and its peak power is $(2/3\pi)^2$ times (i.e., about 4.5% of) the magnitude of the power at the frequency center. The second sidelobe peak is approximately midway between the second and third tones adjacent the central tone and its peak power is $(2/5\pi)^2$ times (i.e., about 1.6% of) the magnitude of the power at the frequency center. The third sidelobe peak is approximately midway between the third and fourth tones adjacent the central tone and its peak power is $(2/7\pi)^2$ times (i.e., about 0.8% of) the magnitude of the power at the frequency center and so on. As can be appreciated, each of these sidelobes has some effect on the received input signal and when combined with the cross-talkers and other noise improve the likelihood that a particular tone will initially be incorrectly interpreted. The presence of the sidelobes also has the potential to adversely influence the initial estimate of the HPNA signal. For example, when tone zeroing is used to estimate the HPNA signal, it should be apparent that the influence of adjacent DMT tones will have some adverse effect on the interpretation of the HPNA signal. Since the initial estimate of both the HPNA signal is not precise, the initial estimate of the DMT signal is not precise as well. The iterative refinement of the soft symbol values is intended to better take into account the influence that the various tones and the HPNA signal have upon one another.

More specifically, step 305 tries to eliminate these effects by recalculating expected values for each symbol in the symbol block. This includes recalculating expected values for each symbol of the primary data signal and each symbol of the superimposed cross talk signal. Furthermore, the expected values for each symbol of the primary data signal are used to calculate expected values for each symbol of the superimposed cross talk signal and the expected values for each symbol of the superimposed cross talk signal are used to calculate each symbol of the primary data signal. As can be appreciated, step 305 propagates expected values until the expected values of the primary signal converge towards a value that most closely resembles the true primary data signal symbol values without the effects of the superimposed cross talk signal (or the side lobes and other noises). In a similar manner, step 305 also propagates expected values until the expected values of the superimposed cross talk signal converge towards a value that most closely resembles the superimposed cross talk signal without the effects of the primary data signal. Block 305 will be described in greater detail in FIG. 4.

After the expected values of both the primary data signal and the cross-talk signal have been calculated in step 305, a decision is made in step 307 as to whether the desired number of iterations have been made to refine the expected values. If not, step 305 is repeated, which again calculates the expected values for each symbol in the symbol block. During subsequent iterations of block 305, the calculations are based at least in part on the preceding calculations. In this manner, the expected values tend to converge to the most likely value. As can be appreciated, the presence of the superimposed cross talk signal generally obscures the primary data signal and thus the computed probability may not heavily favor a particular signal value initially. As a result, the process can proceed either for a fixed number of iterations or until there is no change in the symbols that would be decided by choosing the values with a maximum probability value (reach a plateau). If a fixed number of iterations are used, the number of iterations that are appropriate for a particular system will depend on a number of factors including the quality of the initial estimates, the speed at which the iterations can be processed (since it is viewed as important to interpret the received signal in real time), the tolerable error rate, etc. By way of example, about 5 to about 10 iterations seem appropriate for the described DMT/HPNA system. However, it should be noted that this is not a limitation and that the number of iterations may vary according to the particular set-up used.

The fifth step 309 selects symbol values based on the final expected values for each symbol. The selection is based on the expected value that best approximates the actual or real value for each symbol. That is, as the expected values are iteratively calculated they tend to converge to a value that more closely resembles a true value. Therefore, when the iterations are completed the final expected value tends to point to this true value, and as a result it is selected to be a hard symbol value. The sixth step 311 then outputs the selected symbols. In most embodiments, the outputted symbols are the symbols that coincide with the symbols of the primary data signal. In this manner, the superimposed cross talk signal is effectively removed from the inputted signal and therefore the effects of cross talk interference on the primary data signal are substantially eliminated.

In order to ensure that the algorithm in 305 works and converges, tones in the VDSL need to be zeroed to create a big enough separation between the output points. It should be appreciated that the best tones to zero are generally the ones that have greatest cross talk interference. The zeroed tones may or may not be consecutive and their positions are generally not fixed. Furthermore, it should be noted that more than one tone may need to be zeroed to get a good look at the superimposed cross talk signal. The appropriate number of tones that should be zeroed is dependent on many factors. For example, the number of zeroed tones should be small enough to prevent significant rate loss and large enough to provide a good initial estimate that allows the iterative multi-used detection technique to converge. The number of zeroed tones is also dependent on the size of the frequency spectrum for both the primary data signal and the superimposed cross talk signal. Because of the different requirements of each system it is generally desirable to express the amount of zeroed tones as a percentage of the total tones available in the primary data signal (e.g., 128, 256, . . . 4096). In general, a percentage between about 1.5 and about 3.0 tends to work well. In a more specific example, it has been found that about 6 zeroed tones works well when the primary data signal is a 256 tone VDSL signal and the superimposed cross talk signal is an HPNA signal having a potential frequency band overlap of approximately 6 MHz with the VDSL signal and approximately 58 symbols that overlap a VDSL symbol. It should be noted, however, that this is not a limitation and that the number of zeroed tones may vary according to the specific needs of each system.

The aforementioned interference problem can be considered abstractly for two users using the following framework:

$$y = H_1 \cdot x_1 + H_2 \cdot x_2 + n$$

where the vectors $x_1$ and $x_2$ correspond to vectors of signals from some discrete signaling constellations. The vector y contains the received samples, the matrices describing the channel between the user inputs and the channel output are $H_1$ and $H_2$ respectively, and n is a noise vector. The problem can be easily generalized to any number of users by adding components like $H_m \cdot x_m$ or by considering all "other users" as part of a larger vector component $H_2 \cdot x_2$ When different users are not synchronized, the matrices $H_m$ can vary with time—this analysis considers one block in time only and thus need not propagate a time-index notation. Mutiple phase-lock loops are needed in the practical case of unsynchronized clocks so that the proper H matrices at each block in time can be used in the above model.

Perfect knowledge of the matrices $H_1$ and $H_2$ is assumed. The goal is then to decode the vector $x_1$ (and possibly the vector $x_2$ also in the general case) based on the received signal y. The signal component $H_2 \cdot x_2$ is sometimes treated as an interfering signal, which prevents the decoding of the signal $x_1$. Rather than treating this signal component merely as noise, a receiver can significantly improve performance by jointly detecting the vectors $x_1$ and $x_2$.

A generalization is used in the following where it is observed that all inputs can be decoded as part of giant detection problem that is written as $$y = \begin{bmatrix} H_1 & H_2 \end{bmatrix} \cdot \begin{bmatrix} x_1 \\ x_2 \end{bmatrix} + n = H \cdot x + n$$

where all of the inputs in the vector x are detected. In such detection, each dimension can be considered individually with all other dimensions being alternate or "other" users in an iterative decoding scheme. Furthermore, the set of cross talkers can all be considered as having one large input vector x and a matrix channel H, the latter of which usually has fewer output dimensions than input dimensions. If the noise is small enough, and the matrix H is (as always in practice) one-to-one for the discrete finite set of possible inputs (i.e., different input vector x is mapped to different output symbols without considering noise), then the receiver can reliably recover all the input symbols (for both the primary data signal and the superimposed cross talk signal).

Figure 4:
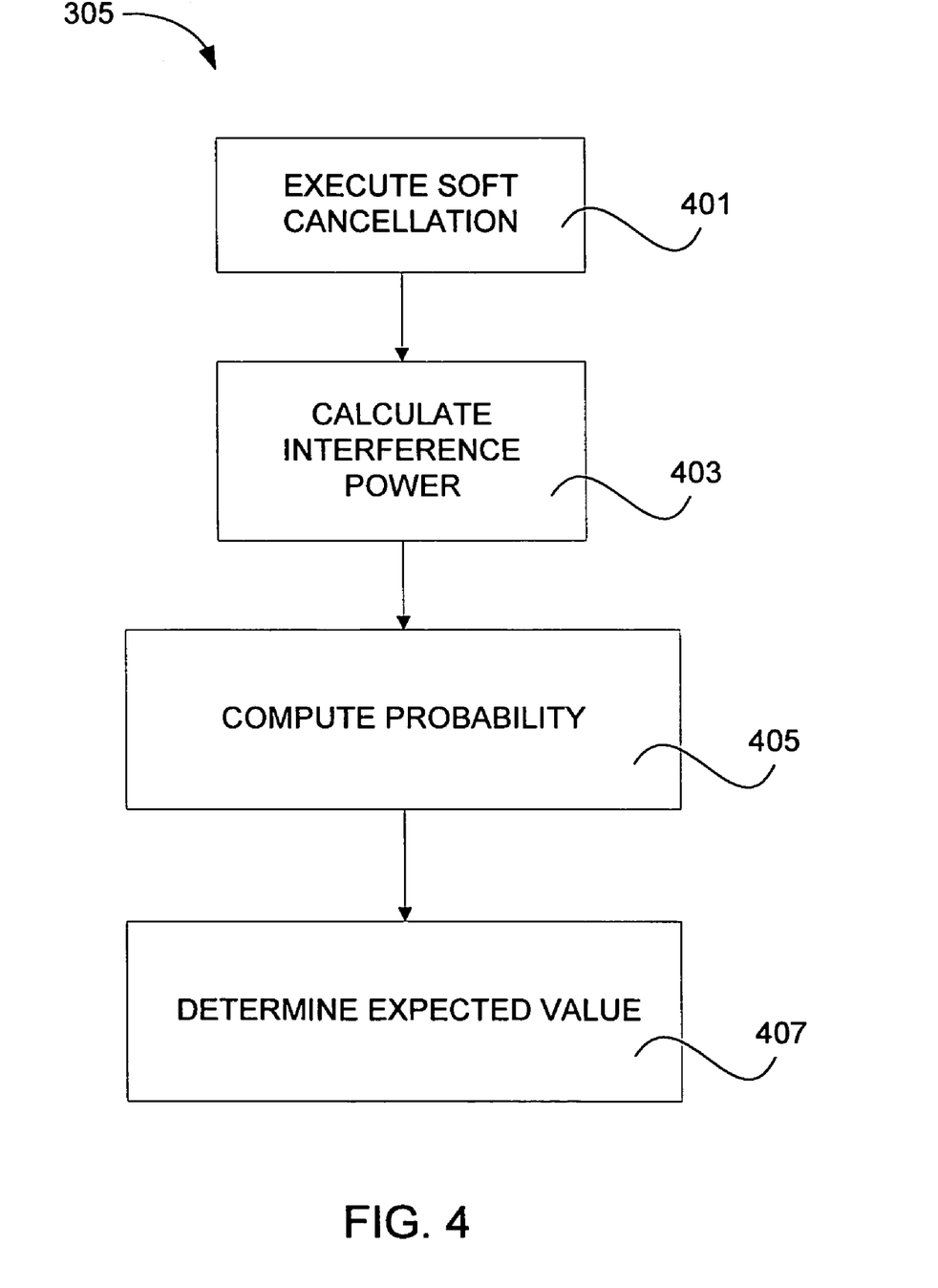
FIG. 4 is a flow diagram of one of the blocks of the iterative multi-user detection techniques of FIG. 3, in accordance with one embodiment of the present invention.

To elaborate further, FIG. 4 shows a flow diagram of the relevant steps involved in calculating expected values for each symbol in the symbol block for block 305 of FIG. 3. The first step 401 includes executing soft cancellation. Soft cancellation generally includes subtracting, from the received symbol block, the effect of the initial estimate (303) or the preceding expected values from prior calculations. As can be appreciated, the term "soft" is used to describe a tentative evaluation or a rough calculation.

The second step 403 includes calculating interference power. The interference power is obtained as the expected value of the square of the difference of the constellation points and the soft value for the other symbol values multiplied by the effect of the channel. The interference power is used to determine the probability distribution of the symbol in consideration, so that a new soft value can be computed for the symbol in consideration. The interference power is computed because the soft symbol is just an estimate of an actual symbol sent. The uncertainty in this estimate needs to be taken into account to obtain a reliable probability distribution.

The third step 405 includes computing a probability distribution for each of the input symbols in consideration. For the most part, the probability distribution is based on the probabilities that the symbol in consideration has a particular value in its constellation. The probabilities are based on the noise plus interference power that was calculated in step 403. That is, the interference noise power has a certain effect on the soft symbol values that may make it more likely to be a hard symbol value. After the probabilities have been computed the process moves to step 407, which involves determining the expected value for the symbol in consideration from the probability distribution. This is typically accomplished by calculating a weighted average between each of the values in the probability distribution to form a new soft symbol value (e.g., expected value) that will converge to a particular symbol that is more likely. Accordingly, the new soft symbol value may be reliable when it is narrowly centered on one value as very likely and unreliable when its not.

Figure 5:
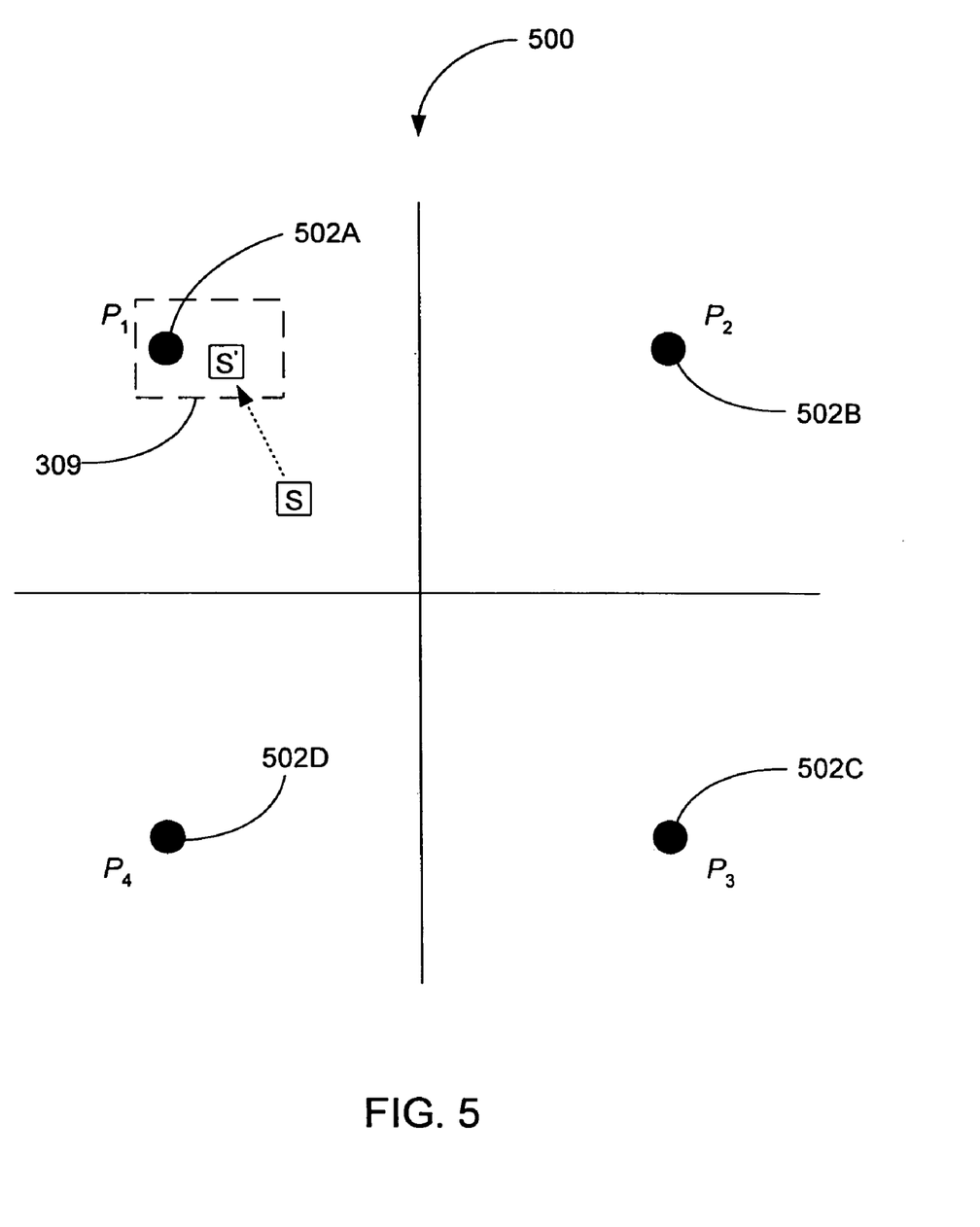
FIG. 5 is an exemplary illustration of a two bit output constellation, in accordance with one embodiment of the present invention.

To facilitate discussion of the aforementioned techniques, FIG. 5 illustrates an exemplary 2 bit output constellation 500 having four states 502. As is well known in the art, each of the four states represents a possible input symbol using a specific control scheme such as VDSL. Output constellations are well known in the art and for the sake of brevity will be limited to the above description. In the theoretical world, assuming no noise or interference, a received symbol would generally coincide with one of the states. However, in this example and because of cross talk interference, the received symbol S is often askew of one of the states. That is, the cross talk interference has some effect on the primary data signal such that the received symbol S tends not to fall on one of the states 502.

With regards to the present invention, a probability distribution P is computed (block 405) between the received symbol S and each of the four states 502 to produce probabilities $P_1$, $P_2$, $P_3$, and $P_4$. $P_1$ represents the probability that S is state 502A, $P_2$ represents the probability that S is state 502B, $P_3$ represents the probability that S is state 502C and $P_4$ represents the probability that S is state 502D. After the probabilities $P_1$, $P_2$, $P_3$, and $P_4$ are calculated, a weighted average is produced that forms a new soft symbol S' (block 407). As can be appreciated, the new soft symbol S' starts to converge to a state 502 that is more likely to be the actual symbol value. For example, if $P_1$ has a probability of about 0.7, $P_2$ has a probability of about 0.2, $P_3$ has a probability of about 0.05, and $P_4$ has a probability of about 0.05 then the average of the four probabilities may place the new soft symbol S' closer to 502A or 502B as shown. Subsequently, another probability distribution and another weighted average that produces yet another new soft symbol value can be computed. Multiple iterations can be made until the new soft symbol S' reaches a probability that is substantially unchanged after the preceding calculation. As mentioned, about 6 iterations tend to produce relatively no change in the probability distribution's weighted average. Accordingly, once the soft symbol value reaches this plateau, the state that best emulates the new soft symbol is selected (block 309).

Although only a 2 bit output constellation is shown and described, it should be noted that this is not a limitation and that other output constellation could be used. For example, a 4 bit constellation, 5 bit constellation, a 6 bit constellation and the like. Importantly, it should also be noted that FIG. 5 and the related description is only exemplary and not limiting in scope of the present invention.

The blocks of FIG. 4 can be considered abstractly using the following framework. For soft cancellation, the receiver needs two quantities that can be computed from a distribution (in this case a conditional distribution of $x_k$ based on the observation of the entire sequence y), the average value or soft symbol $$\chi_k = E_{x_k/y}(x_k)$$

and the corresponding variance about this mean value $$\epsilon_k^2 = E_{x_k/y}(x_k - \chi_k)^2$$

This distribution, or equivalently the two quantities above, can be approximated by using the mean value for other symbols in the linear-canceller expression above instead of decided values, thus averting most of the negatives of error propagation.

Each of the channel output dimensions clearly are not independent unless the matrix H is diagonal. Nonetheless, since soft-canceller algorithms will approximate likelihood functions and probability densities in any case, this analysis assumes they are independent only in so far as the decomposition of the overall likelihood function as $$L_{y/x_k}(a) = \sum_{j=1}^{N} L_{j,k}(a). \quad (L1)$$

(The reader is reminded that N is the number of channel output dimensions, which may often be less than the total number of multiuser symbols.) This expression denotes the possible values for the $k^{th}$ symbol as a. A more complicated expression involving the channel matrices and coupling would otherwise have to be approximated without this independence assumption. Our experiments repeatedly show that this independence assumption does not prevent the convergence of the soft canceller.

It may be helpful to recall that $P_{y/x_k} p_{x_k} = p_{x_k/y} \cdot p_y$, which means that the two conditional densities are proportional to one another and when the input is uniform a priori, the proportionality constant does not involve $x_k$. Thus, when computing soft symbols or soft-symbol variances, either distribution may be used with appropriate normalization.

Assuming a set of initial soft symbol values existing, the soft canceller then first executes the cancellation step $$z_{j,k} = y_j - \sum_{i \neq k} h_{j,i} \cdot \chi_i, \quad \text{[block 401]}$$

where the decision on other symbols is replaced by the soft symbol value. The objective is to compute an estimate of $L_{j,k}(a)$ from $z_{j,k}$. For each possible symbol value a for $x_k$, the receiver can also compute for each tone $$w_{j,k}(a) = z_{j,k} - h_{j,k} \cdot a,$$

which is an estimate of the noise on the $j^{th}$ output dimension given $x_k = a$. The quantity w is distribution-like in that it assumes a value for each a. The value of a for which w has minimum magnitude is the most likely decision. If one assumes this noise estimate is Gaussian (because the noise is Gaussian and it approximates the noise), then the variance of this term can be computed (the mean is assumed zero) to specify the Gaussian distribution as $$\sigma_{j,k}^2 = \sigma_j^2 + \sum_{i \neq k} |h_{j,i}|^2 \cdot \varepsilon_i^2 \quad \text{[block 403]}$$

This variance and the values for a allow approximation of the true distribution. The subchannel likelihood function is then $$L_{j,k}(a) = \log\left\{\frac{1}{\pi \cdot \sigma_{j,k}^2} \cdot e^{-[w_{j,k}(a)]^2 / 2 \cdot \sigma_{j,k}^2}\right\}, \quad \text{[block 405]}$$

for a complex Gaussian random variable. The subchannel terms can be summed over j for each input symbol value to form the overall likelihood function as in (L1). Using equation (L1), one can get $P_{y/x_k}$ from $L_k$. Equivalently, one can form the product of the individual probability distributions to get the overall probability distribution.

Since the overall probability distribution $P_{y/x_k}$ is proportional to the probability distribution $P_{x_k/y}$ by terms that only depend on the value of y, and since the input distribution for each symbol is uniform, the new soft symbol value for a subsequent iteration is then computed according to $$\chi_k = \frac{\sum_a a \cdot p_{y/x_k}(a)}{\sum_a p_{y/x_k}(a)} \quad (L2a) \quad \text{[block 405]}$$

and the variance about this mean value is then $$\varepsilon_k^2 = \frac{\sum_a (a - \chi_k)^2 \cdot p_{y/x_k}(a)}{\sum_a p_{y/x_k}(a)} \cdot (L2b) \quad \text{[block 403]}$$

Having computed these two quantities, the soft symbol and its variance, for each symbol value $x_k$, the algorithm can proceed to a subsequent iteration, where z, w, and L values are again computed. At some point in time the iterations can be stopped (in practice 6–10 iterations is enough) and hard decisions made from the likelihood functions on all symbols. An exception procedure is used to delete likelihoods that may falsely contribute too much to the overall likelihood. If the denominator above in (L2) is below a threshold and too close to zero, the probability of y is small, meaning the information is unreliable and so the soft value is zeroed or left unchanged for the next iteration. This simple check tends to have a significant improvement on the convergence of the algorithm.

As mentioned, for soft cancellation to operate effectively, an initial set of soft symbol values must be obtained. Therefore, in another embodiment of the present invention, a good initial estimate of the soft symbols for the iterative multi-user detection process can be computed according to the psuedo inverse:

$$z = H^*(HH^*)-1y$$

and then computing per symbol dimension, where $x_{max}$ is a per-dimension maximum constellation value. For the real dimension, we have:

$$\text{Re}\{\chi_i\} = \begin{cases} -x_{max} & \text{if Re } \{z_i\} < -x_{max} \\ \text{Re}\{z_i\} & \text{if Re } \{z_i\} \leq x_{max} \\ +x_{max} & \text{if Re } \{z_i\}_i > x_{max} \end{cases}$$

Similarly, for the imaginary dimension. As can be appreciated, this equation can be used to determine estimates for both the primary data signal and the superimposed cross talk signal. Alternatively, $\chi_i$ can be set to zero for the initial estimate, although the rate of convergence might be slower.

Figure 6:
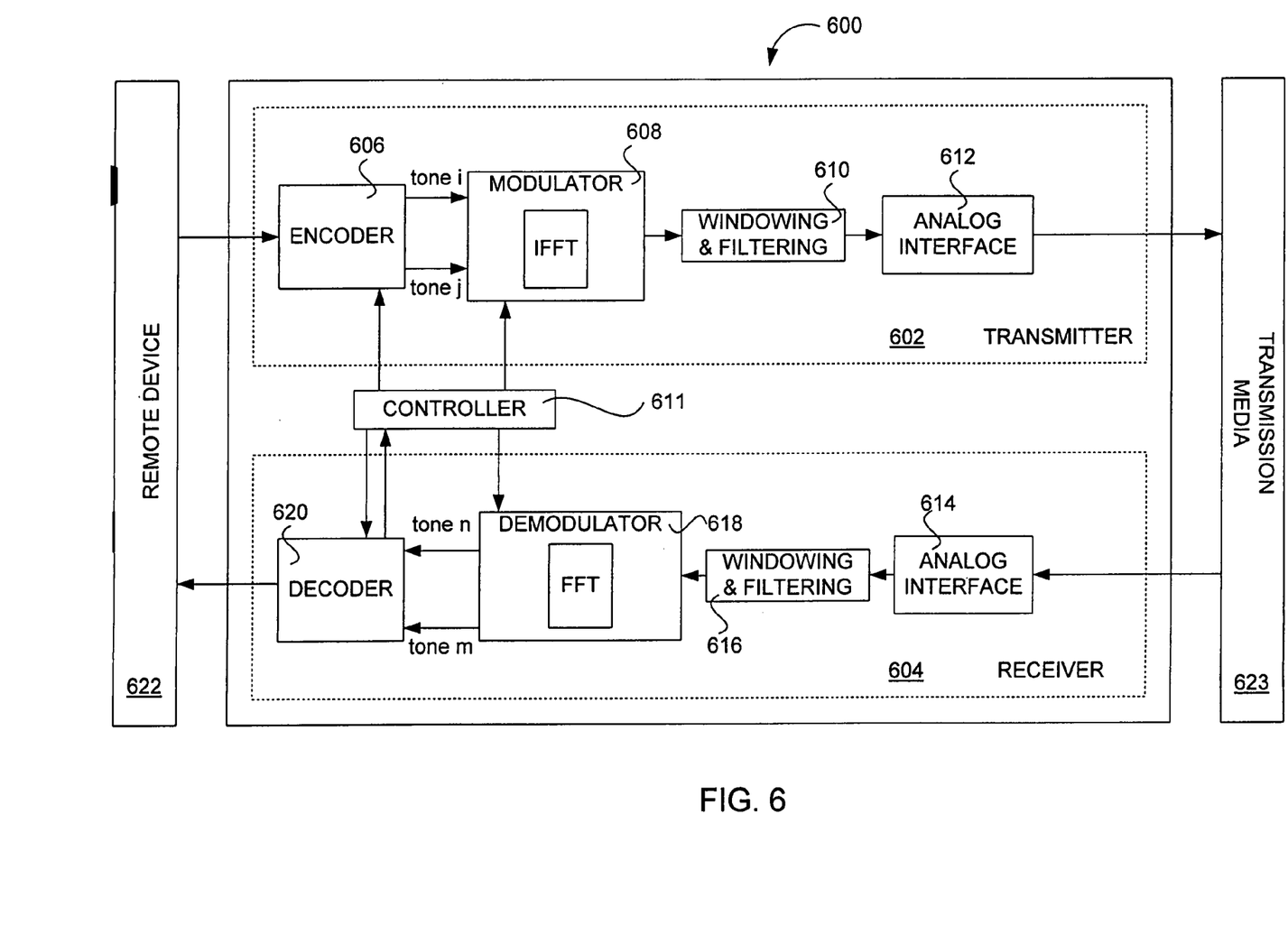
FIG. 6 is an illustration of a modem architecture, in accordance with one embodiment of the invention.

Referring next to FIG. 6, a DMT transceiver architecture suitable for implementing the described iterative multi-user detection technique will be described, in accordance with one embodiment of the present invention. The modem 600 includes a transmitter 602, which incorporates several components including an encoder 606, a discrete multi-tone modulator 608, a windowing filter 610 and a controller 611. The encoder 606 serves to multiplex, synchronize and encode the data to be transferred (such as video data). More specifically, it translates incoming bit streams into in phase and quadrature components for each of the multiplicity of subchannels. The encoding may be done using a variety of error correction schemes. By way of example, forward error correction works well. The encoder 606 would typically be arranged to output a number of subsymbol sequences that are equal to the number of subchannels available to the system. By way of example, in a system having 256 subchannels, the encoder 606 would output 256 subsymbol sequences minus the number of subchannels in the restricted frequency band(s). These inputs are complex inputs that are passed to a discrete multi-tone modulator 608. The modulator 608 is generally an IFFT modulator that computes the inverse Fourier transform by any suitable algorithm.

The bit distribution is adaptively determined in discrete multi-tone systems. To facilitate this, the transmitter also includes a line monitor (not shown) that monitors the communication line to determine the line quality of each of the available subchannels. In one embodiment, the line monitor (which may be part of the controller) determines the noise level, gain and phase shift on each of the subchannels. The object is to estimate the signal-to-noise ratio for each of the subchannels. Therefore, other parameters could be monitored as well or in place of the parameters described. The determination of which subchannels to transmit the encoded data over as well as how much data to transmit over each subchannel is dynamically determined on the basis of several factors. The factors include the detected line quality parameters, subchannel gain parameter, a permissible power mask, and the desired maximum subcarrier bit error rates. It is noted that the factors need not be constant between subchannels and indeed may even vary during use. Most notably, the line quality parameters may be repeatedly checked, and adjustments in the modulation scheme are made in real time to dynamically adjust the modulation as the line quality over various subchannels changes during use. Most notably, the line quality parameters may be repeatedly checked, and adjustments in the modulation scheme are made in real time to dynamically adjust the modulation as the line quality over various subchannels during use.

After the encoded signal has been modulated to form a discrete multi-tone signal, a cyclic prefix is appended to the discrete multi-tone encoded signal. The cyclic prefix is used primarily to simplify the demodulation of the discrete multi-tone signals and is not strictly required. The length of the cyclic prefix may be widely varied. By way of example, in a 512 sample signal, a 40 bit cyclic prefix may be used.

After the encoded signal has been modulated to form a discrete multi-tone signal, the modulated signal is passed through a windowing filter 610 and/or other filters to minimize the out of band energy. This is desirable to help prevent the analog interfaces in the remote receivers from saturating. The windowing can be accomplished by a wide variety of conventional windowing protocols. The transmitter also includes an analog interface 612, which applies the discrete multi-tone signal to the transmission media 623. In hardwired systems such as twisted pair phone lines and coaxial cables, the analog interface 612 may take the form of a line driver.

The modem 600 also includes a receiver 604 for receiving multi-tone signals from the transmitter(s). The receiver 604 generally includes an analog interface 614, a time domain equalizer (TEQ) 616, a demodulator 618, a decoder 620 and a controller 611. Signals received by the receiver 604 (from the transmitter) are initially received through the analog interface 614. The time domain equalizer 616 effectively performs filtering functions on the received signal. A windowing filter (not shown) may also be employed. The demodulator 618 demodulates the equalized discrete multi-tone signal and strips the cyclic prefix. The decoder 620 decodes the demodulated signal. The demodulator 618 and the decoder 620 effectively perform inverse functions of the modulator 608 and encoder 606, respectively. By way of example, the demodulator 618 is generally an FFT modulator that computes the Fourier transform by any suitable algorithm. The decoded signal is then passed from the decoder 620 to a remote device 622 such as a video telephone, a television, a computer, or other suitable receiving apparatus.

Although not shown, an analog notch filter may be provided at a location upstream of the receiver's analog interface in order to block energy within the restricted frequency bands to help guard against the ingress of unwanted RF signals. Furthermore, a transformer may be provided to reject common mode noise.

Figure 7:
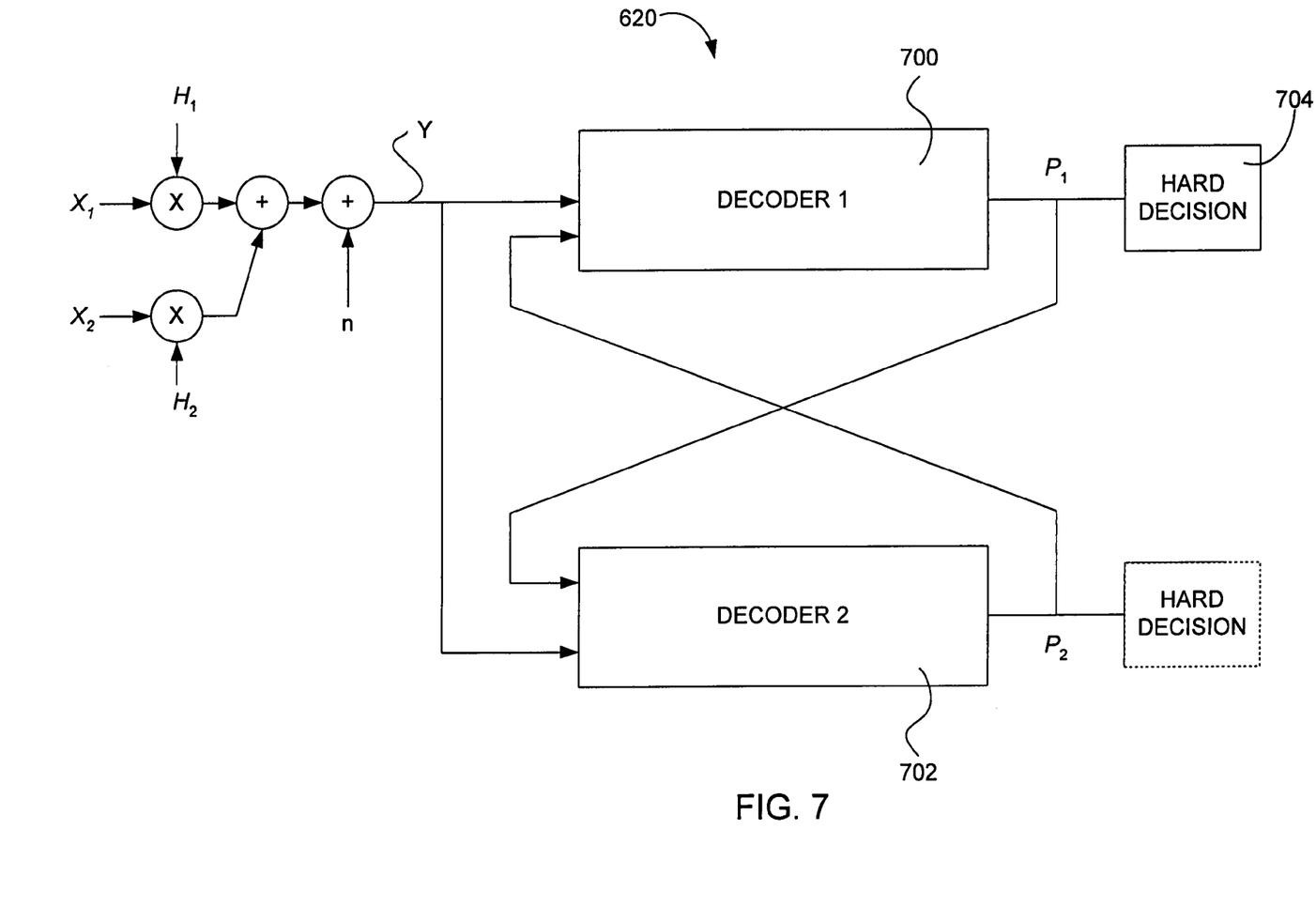
FIG. 7 is an illustration of a decoder, in accordance with one embodiment of the invention.

Referring to FIG. 7, the decoder 620 of FIG. 6 will be described in detail, in accordance with one embodiment of the present invention. The decoder 620 includes a first decoder 700 and a second decoder 702. In this embodiment, first decoder 700 is configured to calculate the expected value for each of the symbols in the primary data signal $X_1$ and second decoder 702 is configured to calculate the expected value for each of the symbols in the superimposed cross talk signal $X_2$. More specifically, decoder 700 is arranged to compute a probability distribution P1 for each of the possible values for the primary data signal $X_1$ and decoder 702 is arranged to compute a probability distribution P2 for each of the possible values for the superimposed cross talk signal $X_2$.

Furthermore, the expected values computed by the first decoder 700 are arranged to be inputted into the second decoder 702 and the expected values computed by the second decoder 702 are arranged to be inputted into the first decoder 700. As can be appreciated, the expected values of the primary data signal from the first decoder 700 tend to lead to better expected values of the superimposed cross talk signal in the second decoder 702. In turn, the expected values computed in the second decoder 702 can be returned to a second pass of the first decoder 700 to produce a better probability distribution than on its first execution. The process can proceed either for a fixed number of iterations or until there is no change in the symbols that would be decided by choosing the values with maximum probability value. When the fixed number of iterations are completed, a hard decision 704 can be made to output the iteratively computed primary data signal X1 to a remote device. Accordingly, the iterative decoding method propagates probability distributions that eventually lead to hard decisions, but also allow interference cancellation.

Although the iterative multi-user detection techniques have been shown and described in the context of a DMT modem, it should be appreciated that this is not a limitation and that the iterative multi-user detection techniques can be used in other types of modem structures as well. Accordingly, FIGS. 6 & 7 are only exemplary and not a limiting in scope of the present invention.

Using the iterative soft interference cancellation, it is possible to detect the VDSL signal in spite of the interference from HPNA, with a reduced error rate. Erroneous blocks may still occur, so that it is necessary to introduce error-correction to handle these errors. In particular, forward error correction (FEC) in the form of byte-oriented Reed-Solomon codes can be used. In one example, a single DMT symbol for VDSL is assumed to correspond to 400 bits. Then putting four VDSL symbols together gives 200 bytes, which is a reasonable length for a byte-oriented Reed-Solomon codeword, which must be less than 255 bytes in total. It is assumed that the FEC is applied over the entire DMT symbol, although the primary cause of errors will be interference from HPNA in the 88 tones (of 256 tones). Since the errors occurs in bursts, due to the nature of the interference cancellation, it is necessary to interleave Reed-Solomon words in order to spread the bursts, decreasing the likelihood that a single Reed-Solomon codeword is hit with an uncorrectable number of errors.

Furthermore, another method that improves iterative decoding is to exploit codes on the individual users. By way of example, low-density parity may be used to improve convergence of the soft-information used by the aforementioned iterative decoding methods. Such information can be very useful when more than one cross talker is significant. Typically 18–24 bits per packet of a few 1000 bits is good for such purposes. Such bits if added to the cross talker (e.g., HPNA) could be ignored by a cross talker receiver. However, if the random pattern selected by each cross talk packet is known or transmitted reliably at the beginning of each packet, it can be used to improve the reliability of estimating the cross talk in the primary signal soft canceller. Such parity could, if desired, be used to provide up to 7–8 dB of coding gain, which may be of use in the cross talking signal to improve data rates or to increase reliability. Additionally, cross talk signals that carry extra parity bytes per packet could potentially be more easily separated from the primary data signals, especially when there are more than one cross talking signal.

In an alternate embodiment, another variant of the decoder is used, which can be called block soft canceller. This is similar to the soft canceller except that a likelihood function is calculated for blocks of 2 or more symbols instead of a single symbol. The cancellation is still done with the soft bits. Thus, the block soft canceller is a compromise between a full maximum likelihood and soft cancellation. Another feature is the inclusion of a simple error detection scheme. If the likelihoods for all the possible transmitted sequences in a block are below a set threshold, this indicates that the interference estimation is inaccurate. In this case, the soft bit is set to zero or left unchanged for the next iteration.

Details associated with iterative multi-user detection techniques are also explained and described in the following references: John M. Cioffi, "REJECTION OF HOME LAN NEXT IN VDSL VIA SOFT CANCELLATION," ETSI TM6, TD15, September 1999, and John M. Cioffi, "G.VDSL: FUNDAMENTALS REQUIREMENTS INDUCED BY G.PNT/G.VDSL MIXTURE", ITU—Telecommunication Standardization Sector, NT-043, November 1999, which are incorporated herein by reference.

As can be seen from the foregoing, the present invention offers numerous advantages. One advantage of the invention is that the primary data signal and the superimposed cross talk signal are separable with little loss in performance. Another advantage of the invention is that the estimate of the cross talk interference is not only very accurate but also adaptive because the estimation is updated during the reception of a signal. As a result, the cross talk interference can be removed at the receiver to produce a true data signal. Furthermore, the invention is particularly suited for any high speed data transmission where cross talk interference produced by neighboring systems or other sources can significantly degrade the desired data signals being received.

While this invention has been described in terms of several preferred embodiments, there are alterations, permutations, and equivalents, which fall within the scope of this invention. For example, although the present invention was described in context with VDSL and HPNA, it should be understood that this is not a limitation and that other coded systems such as T1, ISDN, and the like may be used. It should also be noted that there are many alternative ways of implementing the methods and apparatuses of the present invention. By way of example, although the above-described embodiments are well suited for data transmission over twisted-pair phone lines, the invention is not limited to use with twisted-pair phones lines. For example, the invention may be used in cases where the data transmission is over coaxial cable, T1 lines, or wireless channels. Further, although the invention has been primarily described in the context of a DMT modulation scheme, it should be appreciated that the invention can readily be used in a wide variety of both multi-carrier and single carrier modulation schemes, including carrierless amplitude and phase modulated (CAP) signals, discrete wavelet multi-tone modulation (DWMT) signals, quadrature amplitude modulated (QAM) signals, etc. It is therefore intended that the following appended claims be interpreted as including all such alterations, permutations, and equivalents as fall within the true spirit and scope of the present invention.

What is claimed is:

1. A method of canceling cross talk interference in a received data signal, the method comprising:
   receiving a symbol block;
   obtaining an estimate of symbols in the symbol block;
   iteratively calculating an expected value for each symbol in the symbol block and, therefrom, producing a plurality of iteratively calculated expected values; and
   selecting symbol values based on the iteratively calculated expected values converging toward final expected values for each symbol.

2. The method as recited in claim 1 wherein the calculating includes executing soft cancellation of the estimate or the expected value from a preceding calculation.

3. The method as recited in claim 2 wherein soft cancellation includes subtracting the effect of the estimate from the symbol block to produce an estimate of an interference free value in the symbol block.

4. The method as recited in claim 2 wherein a group of at least two symbols are used when performing soft cancellation.

5. A method of canceling cross talk interference in a received data signal, the method comprising:
   receiving a symbol block;
   obtaining an estimate of symbols in the symbol block;
   iteratively calculating an expected value for each symbol in the symbol block including executing soft cancellation of the estimate or the expected value from a preceding calculation wherein soft cancellation includes subtracting the expected values from the symbol block to produce an estimate of an interference free value symbol the symbol block; and
   selecting symbol values based on final expected values for each symbol.

6. A method of canceling cross talk interference in a received data signal, the method comprising:
   receiving a symbol block;
   obtaining an estimate of symbols in the symbol block;
   iteratively calculating an expected value for each symbol in the symbol block, and including
      executing soft cancellation of the estimate or the expected value from a preceding calculation, and
      calculating interference power to account for the uncertainty of the estimate; and
   selecting symbol values based on final expected values for each symbol.

7. The method as recited in claim 6 wherein the iteratively calculating further includes computing a plurality of probable values, the probable values being based at least in part on the calculated interference power and the soft cancellation.

8. The method as recited in claim 7 wherein the iteratively calculating further includes determining the expected values from the plurality of probable values.

9. The method as recited in claim 8 wherein the symbol block includes primary data signal symbols and superimposed cross talk signal symbols.

10. The method as recited in claim 9 wherein the primary data signal is a discrete multitone signal.

11. The method as recited in claim 10 wherein at least one tone of the multi-tone signal is zeroed to produce better performance of soft cancellation.

12. The method as recited in claim 9 wherein the primary data signal is a Very-High-Speed Digital Subscriber Line signal.

13. A method of canceling cross talk interference in a received data signal, the method comprising:
   receiving a symbol block including primary data signal symbols and superimposed cross talk signal symbols wherein the primary data signal is a discrete multitone signal and wherein at least one tone of the multi-tone signal is zeroed to produce better performance of soft cancellation and the at least one tone of the multitone signal that are zeroed are the ones with the largest interference from the superimposed cross talk signal;
   obtaining an estimate of symbols in the symbol block;
   iteratively calculating an expected value for each symbol in the symbol block including
      executing soft cancellation of the estimate or the expected value from a preceding calculation, calculating interference power to account for the uncertainty of the estimate, computing a plurality of probable values, the probable values being based at least in part on the calculated interference power and the soft cancellation, determining the expected value from the plurality of probable values; and selecting symbol values based on final expected values for each symbol.

14. A method of canceling cross talk interference in a received data signal, the method comprising:

receiving a symbol block including primary data signal symbols and superimposed cross talk signal symbols wherein the superimposed cross talk signal is a Home Phone Network Alliance signal;

obtaining an estimate of symbols in the symbol block;

iteratively calculating an expected value for each symbol in the symbol block including executing soft cancellation of the estimate or the expected value from a preceding calculation, calculating interference power to account for the uncertainty of the estimate, computing a plurality of probable values, the probable values being based at least in part on the calculated interference power and the soft cancellation, determining the expected value from the plurality of probable values; and selecting symbol values based on final expected values for each symbol.

15. A method for removing cross talk interference due to a cross talk source that undesirably interferes with the reception of data being transmitted over a transmission medium by coupling to the transmission medium, the method comprising:

receiving an input signal including a first signal that is superimposed on a second signal, the received signal having a symbol block with input symbols that include a first set of symbols associated with the first signal a second set of symbols associated with the second signal;

producing an estimate for the input symbols;

subtracting the effects of the input symbols from the received symbol block;

computing a probability distribution for each based at least in part on the estimate;

calculating a weighted average from the probability distribution, the weighted average indicating a more likely value for the input symbols.

16. The method as recited in claim 15 wherein the computing is based at least in part on a calculated interference power.

17. The method as recited in claim 15 further including outputting expected values for each of the symbols of the second signal.

18. The method as recited in claim 15 wherein the weighted average is the estimate.

19. A data communication apparatus adapted to cancel cross talk interference in a received data signal, the apparatus comprising:

means for receiving an input signal that includes a primary data signal and a superimposed cross-talk signal;

means for iteratively computing a probable cross talk signal and, therefrom, producing a plurality of iteratively computed probable cross talk signals; and means for calculating the data signal based at least in part upon one of the iteratively computed probable cross talk signals converging toward the superimposed cross-talk signal.

20. The apparatus of claim 19 further comprising means for iteratively computing a probable desired signal estimate, wherein the computed probable desired signal estimate is used in iteratively computing the probable cross talk signal and in calculating the data signal.

21. A data communication apparatus adapted to cancel cross talk interference in a received data signal, the apparatus comprising:

means for receiving an input signal that includes a primary data signal and a superimposed cross-talk signal;

means for iteratively computing a probable cross talk signal; and means for calculating the data signal based at least in part upon the iteratively computed probable cross talk signal resembling the superimposed cross-talk signal and adapted to calculate the data signal based at least in part on the iteratively computed probable cross talk signal being computed for a predetermined number of iterations.

22. A data communication apparatus adapted to cancel cross talk interference in a received data signal, the apparatus comprising:

means for receiving an input signal that includes a primary data signal and a superimposed cross-talk signal;

means for iteratively computing a probable cross talk signal; and means for calculating the data signal based at least in part upon the iteratively computed probable cross talk signal resembling the superimposed cross-talk signal and adapted to calculate the data signal based at least in part on the iteratively computed probable cross talk signal converging toward the superimposed cross talk signal.

* * * * *

UNITED STATES PATENT AND TRADEMARK OFFICE
CERTIFICATE OF CORRECTION

PATENT NO.        : 7,027,537 B1                                      Page 1 of 1
APPLICATION NO.   : 09/519727
DATED             : April 11, 2006
INVENTOR(S)       : Cheong et al.

It is certified that error appears in the above-identified patent and that said Letters Patent is hereby corrected as shown below:

On Title Page

Item (75) Inventors: "John M. Cioffi, Los Altos, CA (US)" should read --John M. Cioffi, Palo Alto, CA (US)--.

Col. 10, line 16: "Mutiple" should read --Multiple--.

Col. 13, line 67: "$z = H^*(HH^*)-1y$" should read -- $z = H^*(HH^*)^{-1}y$ --

Col. 18, line 18: "value symbol the symbol block" should read --value in the symbol block--.

Col. 19, line 44: "distribution for each based" should read --distribution based--.

Signed and Sealed this

Fifth Day of December, 2006

JON W. DUDAS
*Director of the United States Patent and Trademark Office*